(12) United States Patent
Yang et al.

(10) Patent No.: US 7,074,368 B2
(45) Date of Patent: Jul. 11, 2006

(54) BATCH-TYPE POLYESTER POLYMERIZATION APPARATUS

(75) Inventors: Seoung-cheol Yang, Anyang-si (KR); Yang-kuk Son, Gunpo-si (KR)

(73) Assignee: Hyosung Corporation, Seoul (KR)

( * ) Notice: Subject to any disclaimer, the term of this patent is extended or adjusted under 35 U.S.C. 154(b) by 456 days.

(21) Appl. No.: 10/396,145

(22) Filed: Mar. 25, 2003

(65) Prior Publication Data

US 2003/0223917 A1 Dec. 4, 2003

(30) Foreign Application Priority Data

May 31, 2002 (KR) .................. 10-2002-0030751

(51) Int. Cl.
*B32B 5/02* (2006.01)
*C08G 63/02* (2006.01)

(52) U.S. Cl. .................. 422/131; 422/133; 422/134; 528/272; 528/296

(58) Field of Classification Search ................ 422/131, 422/133, 134; 528/272, 296
See application file for complete search history.

(56) References Cited

U.S. PATENT DOCUMENTS

| | | | | |
|---|---|---|---|---|
| 3,987,021 A | * | 10/1976 | Rothert .................. | 526/88 |
| 5,480,616 A | * | 1/1996 | Richardson et al. ........ | 422/134 |
| 5,635,590 A | * | 6/1997 | Rink et al. .................. | 528/500 |
| 6,100,369 A | * | 8/2000 | Miyajima et al. ............ | 528/272 |
| 6,875,839 B1 | * | 4/2005 | Gerking et al. .............. | 528/354 |
| 2005/0163679 A1 | * | 7/2005 | Van Endert et al. ........ | 422/191 |

FOREIGN PATENT DOCUMENTS

| | | |
|---|---|---|
| JP | 63-104602 | 5/1988 |
| JP | 5-53815 | 8/1993 |
| JP | 9-268231 | 10/1997 |
| JP | 10-218982 | * 8/1998 |
| JP | 2001-40080 | 2/2001 |

* cited by examiner

Primary Examiner—N. Bhat
(74) Attorney, Agent, or Firm—Michael J. Striker

(57) ABSTRACT

A batch-type polyester polymerization apparatus manufactured by assembling a conventional batch-type apparatus with a thin film tower. The batch-type polyester polymerization apparatus is advantageous in that oligomer is polymerized while forming a polyester thin film on each inclined plate of a thin film tower, and a polycondensation reaction is conducted in a polycondensation reactor as well as the thin film tower, thus greatly reducing polymerization time.

5 Claims, 1 Drawing Sheet

BATCH-TYPE POLYESTER POLYMERIZATION APPARATUS

BACKGROUND OF THE INVENTION

1. Field of the Invention

The present invention pertains, in general, to a batch-type polyester polymerization apparatus and in particular, to a batch-type polyester polymerization apparatus, which is manufactured by assembling a conventional batch-type apparatus with a thin film tower.

2. Description of the Prior Art

As well known to those skilled in the art, a conventional method of producing polyester comprises the steps of an ester reaction of aromatic diacid with aliphatic or alicyclic glycol, or an ester exchange reaction of low molecular weight alkyl ester of aromatic diacid with aliphatic or alicyclic glycol to produce low molecular weight oligomer; and a polymerization of the oligomer. At this time, the oligomer is polymerized in the presence of a polycondensation catalyst at a temperature of 280° C. or higher under vacuum while continuously removing water and aliphatic glycol to produce polyester with a desirable degree of polymerization.

However, the conventional method is disadvantageous in that the polymerization of the oligomer is conducted at a relatively high temperature and it is difficult to sufficiently agitate the oligomer during the polymerization, thus reducing polymerization efficiency of the oligomer to undesirably extend polymerization time and reduce productivity of polyester.

Many efforts have been made to avoid the above disadvantages. For example, Japanese Patent Laid-Open Publication No. Hei. 09-268231 discloses a method of polymerizing low molecular weight oligomer by spraying it onto a roller under vacuum to produce a polyester sheet, Japanese Patent Laid-Open Publication No. Hei. 01-040080 discloses a method of polymerizing low molecular weight oligomer by spraying it onto a drum under vacuum to produce a polyester film. Other conventional methods are suggested in Japanese Patent Laid-Open Publication No. Sho. 63-104602 in which oligomer is polymerized while being spouted through slits or circular holes to produce polyester sheets or rods, and in Japanese Patent Publication No. Hei. 05-053815 in which oligomer is polymerized while falling freely in a long vertical polymerization tower.

However, these conventional methods produce polyester according to a continuous polymerization process using an undesirably large device, thus causing many problems in their commercialization.

SUMMARY OF THE INVENTION

Therefore, the present invention has been made keeping in mind the above disadvantages occurring in the prior arts, and an object of the present invention is to provide a batch-type polyester polymerization apparatus, which is applied to a batch-type polyester polymerization method, reduces a polycondensation time required to produce polyester, and improves productivity of polyester.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
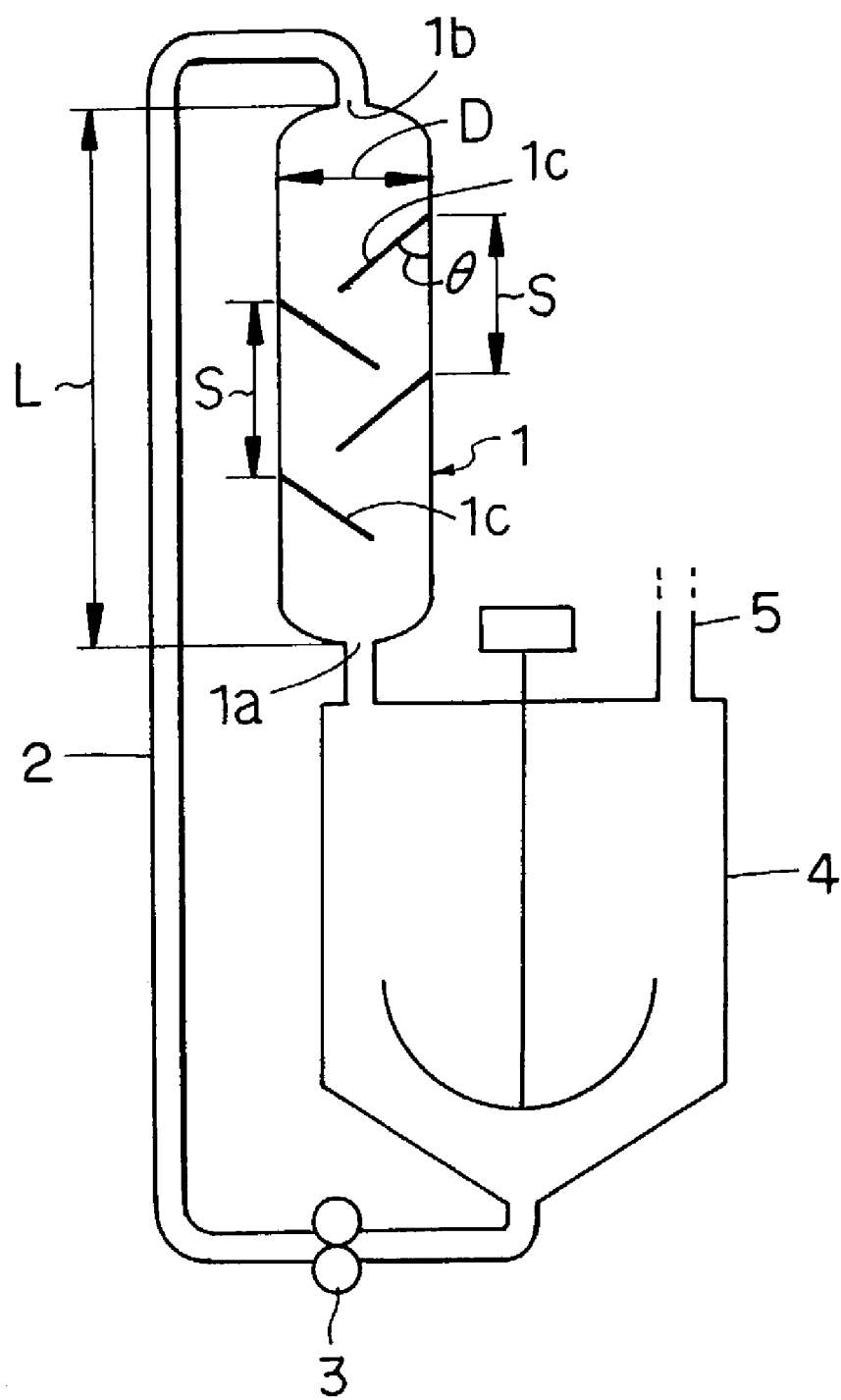
FIG. 1 schematically illustrates a batch-type polyester polymerization apparatus according to the present invention.

Reference now should be made to the drawings, in which the same reference numerals are used throughout the different drawings to designate the same or similar components.

With reference to FIG. 1, a batch-type polyester polymerization apparatus according to the present invention comprises a thin film tower 1 as well as a conventional batch-type polyester polymerization apparatus including a polycondensation reactor 4, a vacuum pipe 5 used to vacuumize the reactor, a reactant recycling pump 3, and a reactant recycling pipe 2.

The thin film tower 1 communicates with a portion of an upper part of the polycondensation reactor 4 at an outlet 1$a$ thereof and with an end of the reactant recycling pipe 2 at an inlet 1$b$ thereof.

Additionally, one to four inclined plates 1$c$ are attached to an inner wall of the thin film tower 1 in such a way that each inclined plate meets the inner wall at a predetermined angle $\theta$.

When the number of the inclined plates is more than four, a polymer solution does not smoothly flow in the thin film tower 1, so it is difficult to reduce a polymerization time of oligomer.

Each inclined plate 1$c$ may have perpendicular holes or slits formed throughout, or may not. A shape of the hole may be a circle, a triangle, a diamond, or a star, and the inclined plates 1$c$ may have one shape of holes or have different shapes of holes.

Furthermore, each inclined plate 1$c$ may be alternately attached to the both opposite sides of the inner wall of the thin film tower 1, or be positioned on only one side of the inner wall.

In order to maximize a surface area of a reactant solution used to produce polyester, the height of the thin film tower 1 should be as high as possible, but if the height of the thin film tower 1 is excessively high, installation cost of the thin film tower 1 is undesirably increased, so the height is determined within a desirable range satisfying the following Equation 1.

$$\frac{\sqrt{Q}}{5} \leq L \leq \sqrt{Q} \qquad \text{Equation 1}$$

(wherein, Q is a weight of the reactant solution in the polycondensation reactor (kg), and L is a height of the thin film tower (m))

For example, when the height of the thin film tower 1 is lower than a lower limit of the range, a retention time of the reactant solution in the thin film tower 1 is too short to sufficiently form a thin film of polyester. On the other hand, when the height is higher than an upper limit of the range, it is difficult to desirably install and operate the thin film tower 1.

Furthermore, a diameter of the thin film tower 1 is determined according to the following Equation 2.

$$4\sqrt{Q} \leq D \leq 40\sqrt{Q} \qquad \text{Equation 2}$$

(wherein, Q is the weight of the reactant solution in the polycondensation reactor (kg), and D is the diameter of the thin film tower (m))

For example, when the diameter of the thin film tower is less than a range according to Equation 2, a polymer solution polymerized in the thin film tower 1 mostly falls in the thin film tower 1 without any resistance, thus not desirably forming thin film polyester. On the other hand, when the diameter is larger than the range of Equation 2, it is difficult to desirably install and operate the thin film tower 1.

Meanwhile, it is preferable that a viewing window (not shown) is formed on an external wall of the thin film tower 1 so as to observe a formation of thin film polyester by naked eye.

As for the inclined plate 1c, it may be manufactured in various shapes so as to maximize production efficiency of a polyester thin film, as described above.

In detail, each inclined plate 1c forms a flat plate without holes, or which has holes with shapes of star, circle, diamond, or triangle, or has slits.

The inclined plate 1c with holes or slits contributes to shortening a polymerization time because a surface area of the reactant solution is desirably increased when the reactant solution flows downwardly through the holes, unlike the inclined plate 1c without holes.

A size of an irregular hole, that is to say, a non-circular hole of the inclined plate 1c, is determined by Equation 3, and a length of the slit of the inclined plate 1c is determined by Equation 4.

$$0.2 \leq r_i \leq r_o, \ 1 \leq r_o \leq 4 \quad \text{Equation 3}$$

(wherein, $r_i$ is a radius (mm) of an inscribed circle of the irregular hole, and $r_o$ is a radius (mm) of a circumscribed circle of the irregular hole. When the shape of the hole is the circle, that is to say, $r_i = r_o$, the radius of the circular hole is 0.2 to 4 mm)

$$0.30 \times \frac{D}{\sin\theta} \leq l_s \leq 0.95 \times \frac{D}{\sin\theta} \quad \text{Equation 4}$$

(wherein, D is a diameter of the thin film tower (cm), $l_s$ the length of the slit (mm), and θ is an angle between the inner wall of the thin film tower 1 and the inclined plate 1c)

When radii of the inscribed circle and the circumscribed circle of the irregular hole are smaller than a range satisfying Equation 3 and viscosity of the polymer solution polymerized in the thin film tower 1 is high, the polymer solution does not smoothly fall through holes and the holes undesirably function to reduce the fluidity of the polymer solution. On the other hand, when the radii are larger than the range according to Equation 3, a remaining surface area of the inclined plate 1c (that is to say, an surface area of the inclined plate other than a total surface area of holes) is too small to sufficiently form the polyester thin film because the polymer solution directly falls in the thin film tower 1c without any resistance.

Furthermore, a ratio of a total surface area of holes (or slits) to a total surface area of the inclined plate 1c is preferably about 30%.

Moreover, when the diameter of the circular hole is smaller than 0.2 mm or the length $l_s$ of the slit is less than a lower limit of a range according to Equation 4 and viscosity of the polymer solution is high, the polymer solution does not smoothly flow downwardly through holes (or slits). On the other hand, when the diameter of the circular hole is larger than 4 mm or the length $l_s$ of the slit is longer than an upper limit of the range satisfying Equation 4, the polymer solution falls in the shape of rod, so the surface area of the polymer solution is not desirably increased, thereby the polymerization time is not shortened.

A distance S between inclined plates $l_c$ is preferably 0.5 to 30 mm.

For example, when the distance between inclined plates is less than 0.5 mm, the polymer solution does not smoothly fall through the holes, but when the distance is more than 30 mm, the thin film tower is poor in terms of economic efficiency.

An angle θ between the inclined plate $l_c$ and the inner wall of the thin film tower 1 is preferably 20 to 70°.

When the angle is less than 20°, the polymer solution falls without any resistance in the thin film tower 1, so the sufficiently thin polyester film is not obtained. On the other hand, when the angle is more than 70°, the polymer solution does not smoothly fall from the inclined plate 1c but is readily accumulated on the inclined plate.

As for a reactant recycling pump 3, its capacity is determined according to following Equation 5.

$$Q \leq C \leq 2Q \quad \text{Equation 5}$$

(wherein, Q is the weight of the reactant solution in the polycondensation reactor (kg), and C is the capacity of the reactant recycling pump (kg/hr))

When the capacity of the reactant recycling pump is less than a range according to Equation 5, recycling of the reactant solution is delayed, thus reducing productivity of polyester. On the other hand, when the capacity is more than the range, an amount of the recycled reactant solution is too large to desirably form the polyester thin film.

As a vacuum pipe 5, a conventional vacuum pipe constituting a conventional batch-type polycondensation reactor may be used as shown in FIG. 1, and an additional vacuum pipe may be installed on the thin film tower 1 so as to promote polymerization, in the thin film tower 1.

A detailed description of the polyester polymerization procedure using the batch-type polyester polymerization apparatus of the present invention will be given, below.

A low molecular weight oligomer is produced by an ester reaction of aromatic diacid with aliphatic or alicyclic glycol, or an ester exchange reaction of low molecular weight alkyl ester of aromatic diacid with aliphatic or alicyclic glycol. The oligomer is then polymerized using the batch-type apparatus of the present invention as shown in FIG. 1 to form the polyester thin film on the inclined plate 1c of the thin film tower 1. At this time, the batch-type apparatus of the present invention is advantageous in that polycondensation is conducted for a shortened time and polyester with a high degree of polymerization is obtained.

In other words, the present invention has advantages in that polyester is yielded by forming the polyester thin film with a thickness of 1 mm or less on the inclined plate 1c of the thin film tower 1 so as to improve the degree of polymerization, thus desirably rapidly accomplishing polymerization of the oligomer, and the polymerization is conducted in the polycondensation reactor 4 as well as the thin film tower 1, thus desirably reducing the polymerization time and improving the degree of polymerization.

A description of raw materials used to produce polyester will be given, below.

Materials containing reactive carboxyl or ester group are used as aromatic diacid and low molecular weight alkylester thereof.

In detail, aromatic diacid and low molecular weight alkylester thereof may be selected from the group consisting of terephthalic acid, isophthalic acid, phthalic acid, naphthalene-2,6-dicarboxylic acid, naphthalene-2,5-dicarboxylic acid, low molecular weight alkyl ester thereof, i.e. methyl ester or ethyl ester, and a mixture thereof.

Additionally, aliphatic or alicyclic glycol is selected from the group consisting of aliphatic glycols with two to six carbons such as ethylene glycol, trimethylene glycol, 1,4-butylene glycol (1,4-butandiol), 1,3-butylene glycol, 1,5-pentane diol, 1,6-hexane diol, and neopentyl glycol, and alicyclic glycols with two to six carbons such as 1,4-cyclohexane dimethanol.

Meanwhile, a copolymerization monomer may be used to reform polyester.

For example, acid based copolymerization monomer such as dimethyl sodium sulfur isophthalate and 9,10-dihydro-9-oxa-10-(2,3-dicarboxypropyl)-10-phosphaphenanthrene-10-oxide, polyethylene glycol, polypropylene glycol, polyalkylene ether glycol such as polytetramethylene ether glycol, or diethylene glycol may be used.

Moreover, inorganic materials may be added to polyester so as to provide various physical properties to polyester. The inorganic materials are selected from the group consisting of titanium dioxide, barium sulfate, silica, and zeolite.

An inorganic material content in polyester is preferably 10 wt % or less so as not to degrade intrinsic physical properties of polyester.

Meanwhile, a catalyst used to produce polyester is selected from the group consisting of conventional polyester polymerization catalysts such as antimony-based, titanium-based, and germanium-based catalysts.

It is preferable that a reactive metal content of the catalyst in polyester is 5 to 500 ppm based on polyester.

More precisely speaking about a preferable range of each catalyst content in polyester, it is preferable that an antimony atom content of the antimony-based catalyst in polyester is 100 to 400 ppm, a titanium atom content of the titanium-based catalyst in polyester is 10 to 100 ppm, and a germanium atom content of the germanium-based catalyst in polyester is 20 to 100 ppm.

When any catalyst content is lower than the above preferable range, its catalytic activity is too low to obtain the desired degree, of polymerization. On the other hand, when the catalyst content is higher than the above preferable range, production cost of polyester is undesirably increased and quality of polyester is poor because of an excessive amount of the catalyst in polyester.

Furthermore, an additive such as a heat stabilizer and a UV stabilizer may be further added to polyester.

For example, a phosphorous based stabilizer such as trimethyl phosphate and triphenyl phosphite, a phenol based stabilizer such as Iganox 1010 manufactured by CIBA-GEIGY Corp., or a hindered amine light stabilizer (HALS) such as Tinubin 234 may be used.

A stabilizer content in polyester is preferably 1 wt % or less.

When the stabilizer content is more than 1 wt %, production cost of polyester is undesirably increased and physical properties of polyester are poor.

According to the present invention, an ester or ester exchange reaction is conducted using the above raw materials in the thin film tower 1, and after the ester or ester exchange reaction is conducted to 95% or higher completion to produce oligomer, the oligomer is moved to the polycondensation reactor 4 by injecting nitrogen to the thin film tower 1.

The catalyst and additives are added to the oligomer to form the reactant solution, and the reactant solution is moved through the reactant recycling pipe 2 to the thin film tower 1 by the reactant recycling pump 3 and falls to the inclined pipes 1c in the thin film tower 1 to be polymerized while forming the polyester thin film.

A better understanding of the present invention may be obtained in light of the following examples which are set forth to illustrate, but are not to be construed to limit the present invention.

A degree of thin film formation and an intrinsic viscosity were determined by the following methods:

1. Degree of thin film formation: Thickness of the thin film on the inclined plate 1c was observed through a viewing window of the thin film tower 1 by naked eye. If the thickness was 1 mm or less, the degree of thin film formation was estimated as excellent, but if the thickness is more than 1 mm, the degree of thin film formation was estimated as poor.

2. Intrinsic viscosity (IV): The intrinsic viscosity of the thin film was measured using a solvent in which phenol is mixed with 1,1,2,2-tetrachloroethane in a weight ratio of 6:4 at 25° C.

EXAMPLE 1

A thin film tower 1 with a height of 2 m and a diameter of 50 cm was connected to a batch-type polycondensation reactor 4, inclined plates 1c having circular holes with a diameter of 2 cm each were set in the thin film tower 1, and an angle θ between an inner wall of the thin film tower 1 and each inclined plate 1c was 45°.

10 kg of oligomer with a low degree of polymerization which was produced by an ester reaction (conversion: 97%) was added to the batch-type polycondensation reactor 4, 380 ppm antimony trioxide based on the oligomer was further added to the batch-type polycondensation reactor 4, and an inside of the batch-type polycondensation reactor 4 was vacuumized by a reactant recycling pump 3 for 90 min (after 50 min, the inside of the reactor was highly vacuumized) to produce polyester. The degree of thin film formation and intrinsic viscosity of polyester were evaluated, and the results are described in Table 1.

COMPARATIVE EXAMPLE 1

The procedure of example 1 was repeated except that 15 kg oligomer was added to the batch-type polycondensation reactor and the capacity of the reactant recycling pump was 5 kg/hr. The results are described in Table 1.

EXAMPLES 2 TO 5 AND COMPARATIVE EXAMPLES 2 TO 3

The procedure of example 1 was repeated except that a shape and size ($r_o$, $r_i$, $l_s$) of the hole of the inclined plate 1c, an angle θ between an inner wall of the thin film tower and each inclined plate 1c, and the intrinsic viscosity of the oligomer were different from those of example 1. The results are described in Table 1.

COMPARATIVE EXAMPLE 4

Oligomer with a low degree of polymerization which was produced by an ester reaction (conversion: 97%) was added to a conventional batch-type polycondensation reactor which is not connected to a thin film reactor, 380 ppm antimony trioxide based on the oligomer was further added to the conventional batch-type polycondensation reactor, and an inside of the conventional batch-type polycondensation reactor was vacuumized for 150 min to yield polyester. The intrinsic viscosity (IV) of polyester thus yielded was 0.64 dl/g.

TABLE 1

|  | Ex. 1 | Co. Ex. 1 | Ex. 2 | Co. Ex. 2 | Ex. 3 | Co. Ex. 3 | Ex. 4 | Ex. 5 |
|---|---|---|---|---|---|---|---|---|
| [1]Oligomer | 0.1 | 0.1 | 0.1 | 0.1 | 0.1 | 0.1 | 0.1 | 0.1 |
| [2]Plate | 2 | 2 | 2 | 2 | 2 | 2 | 3 | 2 |
| [3]Hole | Circle | Circle | diamond | diamond | star | star | slit | — |
| $r_i$ (cm) | 2 | 2 | 1 | 1 | 1 | 1 | — | — |
| $r_o$ (cm) | 2 | 2 | 1.41 | 1.41 | 3 | 5 | — | — |
| $l_s$ (cm) | — | — | — | — | — | — | 30 | — |
| θ (°) | 45 | 45 | 30 | 80 | 45 | 45 | 45 | 45 |
| C (kg/hr) | 15 | 5 | 15 | 15 | 15 | 15 | 15 | 15 |
| [4]Film | Excel. | Excel. | Excel. | Poor | Excel. | Poor | Excel. | Excel. |
| [5]Polymer | 0.65 | 0.57 | 0.62 | 0.49 | 0.64 | 0.51 | 0.63 | 0.61 |

[1]Oligomer: intrinsic viscosity of the oligomer
[2]Plate: number of inclined plates
[3]Hole: shape of hole of inclined plate
[4]Film: Degree of thin film formation
[5]Polymer: intrinsic viscosity of polymer
Excel.: excellent From the results of Table 1, it can be seen that a polymerization time is 90 min in the case of example 1 in which the thin film tower is used to produce polyester, but the polymerization time is 150 min in the case of comparative example 4 without the thin film tower. Accordingly, the present invention has an advantage of reduced polymerization time.

As described above, in the present invention, polyester is produced while forming a polyester thin film on each inclined plate 1c of a thin film tower 1, and a polycondensation reaction is conducted in a polycondensation reactor as well as the thin film tower 1, thus greatly reducing the polymerization time.

Furthermore, a batch-type polyester polymerization apparatus according to the present invention comprises the thin film tower assembled with a conventional polyester polymerization apparatus. Therefore, objects of the present invention can be readily accomplished by modifying the conventional polyester polymerization apparatus, thereby reducing installation cost of the batch-type polyester polymerization apparatus. Additionally, the polymerization time is shortened as described above, thereby reducing production cost of polyester.

It should also be understood that the foregoing relates to only the scope of the invention is defined by the appended claims rather than by the description preceding them, and all changes that fall within meets and bounds of the claims, or equivalence of such meets and bounds are therefore intended to be embraced by the claims.

What is claimed is:

1. A batch-type polyester polymerization apparatus including a polycondensation reactor communicating with a vacuum pipe used to vacuumize the reactor, a reactant recycling pump, and a reactant recycling pipe, further comprising:
a thin film tower communicating with a portion of an upper part of the polycondensation reactor at an outlet thereof and with an end of the reactant recycling pipe at an inlet thereof, said thin film tower including a plurality of inclined plates attached to an inner wall of the thin film tower in such a way that each inclined plate meets the inner wall at a predetermined angle, wherein the thin film tower has a height and a diameter satisfying the following Equations 1 and 2:

$$\text{Equation 1}: \frac{\sqrt{Q}}{5} \leq L \leq \sqrt{Q}$$

(wherein, Q is a weight of a reactant solution in the polycondensation reactor (kg), and L is the height of the thin film tower (m))

$$4\sqrt{Q} \leq D \leq 40\sqrt{Q} \qquad \text{Equation 2}$$

(wherein, Q is the weight of the reactant solution in the polycondensation reactor (kg), and D is the diameter of the thin film tower (m)).

2. The batch-type polyester polymerization apparatus as set forth in claim 1, wherein an angle between the inner wall of the thin film tower and each inclined plate is 20 to 70°.

3. The batch-type polyester polymerization apparatus as set forth in claim 1, wherein each inclined plate forms a flat plate without holes, or has circular holes or irregular holes having any one shape selected from the group consisting of star, diamond, triangle, and slit.

4. The batch-type polyester polymerization apparatus as set forth in claim 3, wherein a size of an irregular hole of the inclined plate is determined by following Equations 3 and 4:

$$0.2 \leq r_i \leq r_o, \ 1 \leq r_o 4 \qquad \text{Equation 3}$$

(wherein, r1 is a radius (mm) of an inscribed circle of the irregular hole, and $r_o$ is a radius (mm) of a circumscribed circle of the irregular hole. In the case of a circular hole, $r_i = r_o$, the radius of the circular hole is 0.2 to 4 mm)

$$0.30 \times \frac{D}{\sin\theta} \leq l_s \leq 0.95 \times \frac{D}{\sin\theta} \qquad \text{Equation 4}$$

(wherein, D is a diameter of a thin film tower (cm), $l_s$ is a length of the slit (mm), and θ is an angle between an inner wall of the thin film tower and the inclined plate).

5. The batch-type polyester polymerization apparatus as set forth in claim 1, wherein a capacity of the reactant recycling pump is determined according to following Equation 5:

$$Q \leq C \leq 2Q \qquad \text{Equation 5}$$

(wherein, Q is a weight of a reactant solution in the polycondensation reactor (kg), and C is the capacity of the reactant recycling pump (kg/hr)).

* * * * *